(12) United States Patent
Huang et al.

(10) Patent No.: US 6,917,867 B2
(45) Date of Patent: Jul. 12, 2005

(54) OPERATOR INPUT DEVICE WITH TACTILE FEEDBACK

(75) Inventors: Xiaodong Huang, Peoria, IL (US); John James Krone, Dunlap, IL (US); Sairam Gopalan Velamakanni, Chicago, IL (US); Sabri Cetinkunt, Oak Park, IL (US)

(73) Assignees: Caterpillar Inc, Peoria, IL (US); University of Illinois at Chicago, Chicago, IL (US)

( * ) Notice: Subject to any disclaimer, the term of this patent is extended or adjusted under 35 U.S.C. 154(b) by 21 days.

(21) Appl. No.: 10/411,403

(22) Filed: Apr. 10, 2003

(65) Prior Publication Data

US 2004/0204811 A1 Oct. 14, 2004

(51) Int. Cl.[7] ............................................... G06F 19/00
(52) U.S. Cl. ........................................ 701/50; 345/156
(58) Field of Search ...................... 701/51, 50; 37/414, 37/415; 172/4.5, 6, 9; 345/156, 161, 162; 414/699

(56) References Cited

U.S. PATENT DOCUMENTS

| | | | | |
|---|---|---|---|---|
| 4,513,235 A | * | 4/1985 | Acklam et al. ............. 318/685 |
| 4,516,063 A | * | 5/1985 | Kaye et al. ................. 318/685 |
| 5,721,566 A | | 2/1998 | Rosenberg et al. |
| 5,970,997 A | * | 10/1999 | Hudson et al. ................ 137/1 |
| 6,192,770 B1 | * | 2/2001 | Miyoshi et al. .......... 74/473.18 |
| 6,330,502 B1 | | 12/2001 | Cetinkunt et al. |
| 6,371,214 B1 | | 4/2002 | Anwar et al. |
| 6,459,976 B1 | | 10/2002 | Chen et al. |
| 6,636,197 B1 | * | 10/2003 | Goldenberg et al. ........ 345/156 |
| 2003/0172757 A1 | * | 9/2003 | Yone .......................... 74/335 |
| 2004/0032395 A1 | * | 2/2004 | Goldenberg et al. ........ 345/156 |

* cited by examiner

Primary Examiner—Gary Chin
(74) Attorney, Agent, or Firm—Howard & Howard; Kevin C Earle

(57) ABSTRACT

An operator input device includes an operator interface mechanism operable by an operator, a position sensor, a brake controller, and a resistive actuator. The operator interface mechanism is moveable in at least first and second directions along an axis. The position sensor is coupled to the operator interface mechanism for transmitting an operator interface mechanism position signal as a function of the position of the operator interface mechanism. The brake controller is coupled to the position sensor for receiving the operator interface mechanism position signal and responsively transmitting a brake signal. The resistive actuator is coupled to the brake controller and the operator interface mechanism and receives the brake signal and responsively applies a resistive force to the operator interface mechanism.

41 Claims, 3 Drawing Sheets

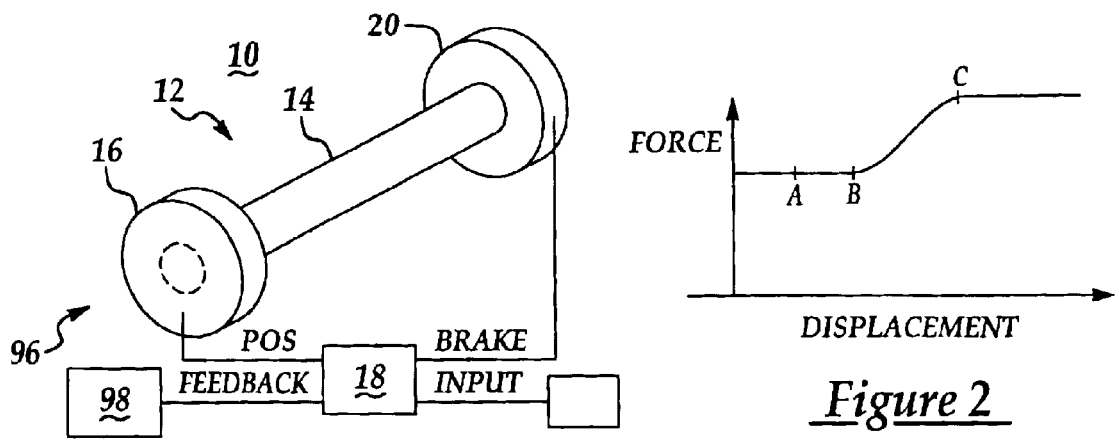
Figure 1
Figure 2
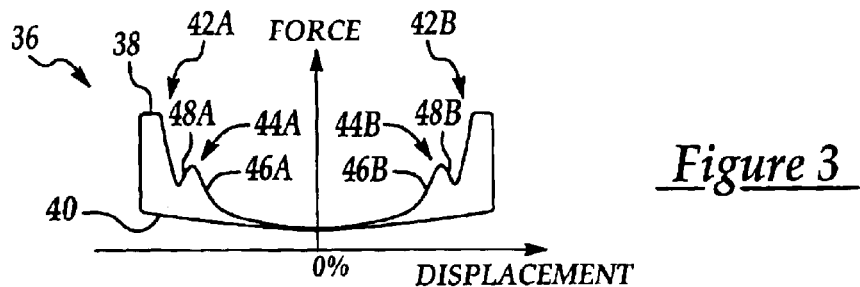
Figure 3
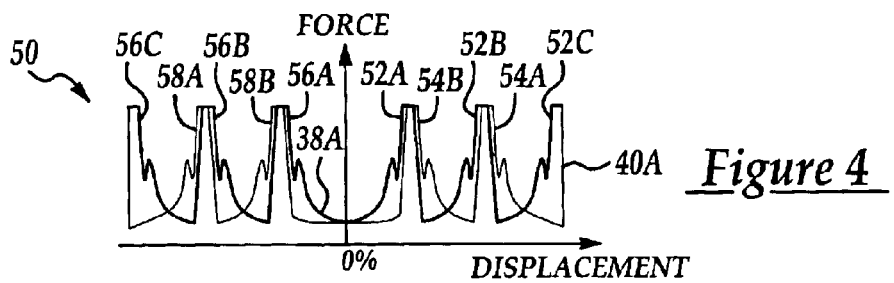
Figure 4
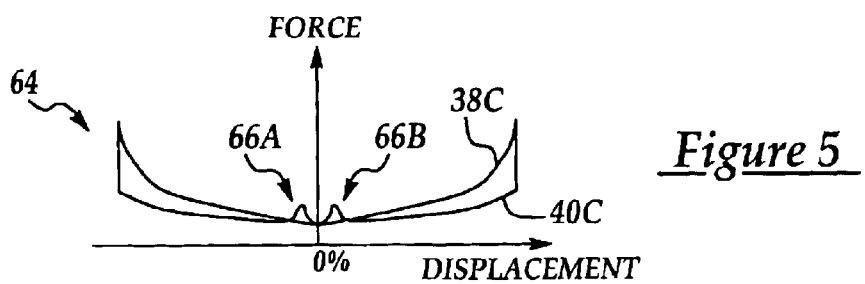
Figure 5

OPERATOR INPUT DEVICE WITH TACTILE FEEDBACK

TECHNICAL FIELD

The present invention relates generally to an operator input device, and more particularly, to an operator input device with tactile feedback.

BACKGROUND

Mechanical devices are commonly controlled by operators through mechanical input devices, such as levers, pedals, or buttons. For example, injection of fuel into an engine may be controlled by a pedal which is actuated by an operator's foot. Additionally, actuation of a hydraulic actuator on a work machine may be operated via a control lever. Due to the mechanical nature of these devices and associated linkages to the controlled device, there is generally a tactile feel and/or feedback associated with the input device.

These types of mechanical devices, however, may have two fundamental shortcomings. First, as with any mechanical device, they may require regular lubrication or else suffer excessive wear, eventually failing altogether. Second the mechanical nature of the devices provide "fixed" tactile feedback. In other words, the feedback is defined by the device and/or the system in which it is being used.

The present invention is aimed at one or more of the problems identified above.

SUMMARY OF THE INVENTION

In a first aspect of the present invention, an operator input device having an operator interface mechanism operable by an operator, a position sensor, a brake controller, and a resistive actuator is provided. The operator interface mechanism is moveable in at least first and second directions along an axis. The position sensor is coupled to the operator interface mechanism for transmitting an operator interface mechanism position signal as a function of the position of the operator interface mechanism. The brake controller is coupled to the position sensor for receiving the operator interface mechanism position signal and responsively transmitting a brake signal. The resistive actuator is coupled to the brake controller and the operator interface mechanism and receives the brake signal and responsively applies a resistive force to the operator interface mechanism. The resistive force opposes force applied to the operator interface mechanism by the operator. The resistive force provides a detent function and a detent pre-feel function to the operator interface mechanism.

In a second aspect of the present invention, an operator input device having an operator interface mechanism, a position sensor, a brake controller and a resistive actuator is provided. The operator interface mechanism is operable by an operator and is moveable in at least first and second directions along an axis. The position sensor is coupled to the operator interface mechanism for transmitting an operator interface mechanism position signal as a function of the position of the operator interface mechanism. The brake controller is coupled to the position sensor for receiving the operator interface mechanism position signal and responsively transmitting a brake signal. The resistive actuator is coupled to the brake controller and the operator interface mechanism for receiving the brake signal and responsively applying a resistive force to the operator interface mechanism. The resistive force opposes the force applied to the operator interface mechanism by the operator. The resistive force provides at least two detent functions in one of the first and second directions.

In a third aspect of the present invention, an operator input device, having an operator interface mechanism, a position sensor, a brake controller, an operator input mechanism, and a resistive actuator is provided. The operator interface mechanism is operable by an operator and moveable in at least first and second directions along an axis. The position sensor is coupled to the operator interface mechanism for transmitting an operator interface mechanism position signal as a function of the position of the operator interface mechanism. The brake controller is coupled to the position sensor for receiving the operator interface mechanism position signal and responsively transmitting a brake signal. The operator input mechanism is coupled to the brake controller for delivering an input signal to the brake controller in response to actuation by the operator. The resistive actuator is coupled to the brake controller and the operator interface mechanism for receiving the brake signal and responsively applying a resistive force to the operator interface mechanism. The resistive force opposes the force applied to the operator interface mechanism by the operator and provides a detent function to the operator interface mechanism. The detent function is defined with respect to a programmable position of the operator interface mechanism. The brake controller receives the input signal and responsively sets the programmable position.

In a fourth aspect of the present invention, an operator input device having an operator interface mechanism, a position sensor, a biasing member, a brake controller, and a resistive actuator is provided. The operator interface mechanism is operable by an operator and is moveable in at least first and second directions along an axis. The position sensor is coupled to the operator interface mechanism for transmitting an operator interface mechanism position signal as a function of the position of the operator interface mechanism. The biasing member is coupled to the operator interface mechanism for biasing the operator interface towards a neutral position. The brake controller is coupled to the position sensor for receiving the operator interface mechanism position signal and responsively transmitting a brake signal. The resistive actuator is coupled to the brake controller and the operator interface mechanism for receiving the brake signal and responsively applying a resistive force to the operator interface mechanism. The resistive force opposes the force applied to the operator interface mechanism by the operator and provides a detent function. The brake controller detects a return to neutral condition and responsively applies an overshoot elimination force.

In a fifth aspect of the present invention, an operator input device having an operator interface mechanism, a position sensor, a sensing device, a brake controller, and a resistive actuator is provided. The operator interface mechanism is operable by an operator and is moveable in at least first and second directions along an axis. The position sensor is coupled to the operator interface mechanism for transmitting an operator interface mechanism position signal as a function of the position of the operator interface mechanism. The sensing device is coupled to the machine for determining a parameter of the machine and delivering a parameter signal. The brake controller is coupled to the position sensor and to the sensing device for receiving the operator interface mechanism position signal and the parameter signal and responsively transmitting a brake signal as a function thereof. The resistive actuator is coupled to the brake controller and the operator interface mechanism for receiving the brake signal and responsively applying a resistive force to the operator interface mechanism. The resistive force opposes the force applied to the operator interface mechanism by the operator.

BRIEF DESCRIPTION OF THE DRAWINGS

FIG. 1 is an isometric view and functional block diagram of an operator input device, according to an embodiment of the present invention;

FIG. 2 is a graph of braking force versus shaft position for an operator input device, according to an embodiment of the present invention;

FIG. 3 is a graph of braking force versus displacement for an operator input device showing a detent function with a detent pre-feel, according to an embodiment of the present invention;

FIG. 4 is a graph of braking force versus displacement for an operator input device showing multiple detent functions, according to an embodiment of the present invention;

FIG. 5 is a graph of braking force versus displacement for an operator input device showing increase braking force as the operator input device moves toward a neutral position, according to an embodiment of the present invention;

DETAILED DESCRIPTION

Figure 6:
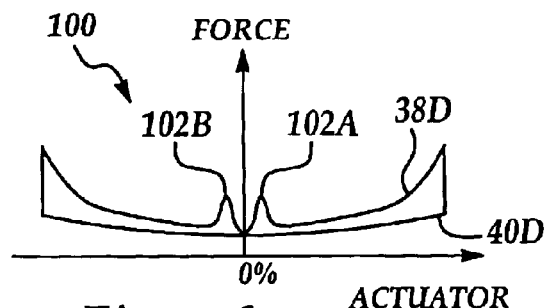
FIG. 6 is a graph of braking force versus displacement for an operator input device showing increase braking force prior to movement of an actuator, according to an embodiment of the present invention.

With reference to the drawings and in operation, the present invention provides an operator input device, generally noted by the reference number 10 which provides tactile feedback to an operator (not shown).

The operator input device 10 includes an operator interface mechanism 12. In one embodiment, the operator interface mechanism 12 may include a first shaft 14. The first shaft 14 may be operable to move in predetermined manner, such as rotation. It should be noted that the first shaft 14 may also move in a different manner, for example, linearly along an axis. A first position sensor 16, such as a rotary position sensor, is coupled to the operator interface mechanism 12. The first position sensor 16 may determine the position of the operator interface mechanism 12 and transmit a first shaft position signal (POS1) as a function of the position. In the illustrated embodiment, the first rotary position sensor 16 determines the rotary position of the first shaft 14 and transmits the first shaft position signal (POS1) as a function of the rotary position.

A processing device, such as a brake or viscosity controller 18, may be coupled to the position sensor 16 to receive the shaft position signal, POS. The brake controller 18, as of a function of at least the shaft position signal, determines and transmits a first brake signal, BRAKE1.

The brake controller 18 may also receive other control or sensor signals (see below) from other devices. The first brake signal may be determined as a function of the position signal and/or one or more of these other control signals.

A resistive actuator 20, such as a linear or rotary brake, may be coupled to the first shaft 14 and the brake controller 18. One suitable type of brake may be a fluid or fluid resistance device. The brake 20 receives the first brake signal from the brake controller 18. In one embodiment, the fluid brake 20 may be a magneto-rheological or an electro-rheological fluid brake. Other types of brakes or rotary brakes may also be used. The brake 20 applies a braking or resistive force to the first shaft 14 in response to the first brake signal (BRAKE1), thereby restricting or preventing movement of the first shaft 14.

The brake controller 18 may be programmed with a map to provide a detent or virtual detent function which correlates the brake position signal with the position signal and/or the other sensor signals. The detent function provides tactile feedback to the operator of the input device that a predetermined position of the operator input device 10 is being approached and/or has been reached. This is illustrated in FIG. 2. Initially at point A, as the first shaft 14 rotates towards a desired detent, the braking force from the fluid brake 19 remains constant. At point B, the first shaft 14 has almost reached the desired detent force begins to increase. At point C, the first shaft 14 is in the detent position. In one embodiment, the first shaft 14 may be retained in the detent position by the braking force, i.e., the operator would not be able to move past the detent position. In another embodiment, the first shaft 14 may be moved past the detent position. As the first shaft 14 moves past the detent position, the braking force increases, resisting movement of the first shaft 14 from the detent position. Typically, the magnitude of the braking force will be significantly greater than the braking force at point A, although it need not be. The predetermined position at which the detent function is defined is programmable and may be modified within the controller 18.

In one embodiment of the present invention, the brake controller 18 may be programmed with a map correlating the first brake signal, BRAKE1, with one or more inputs, e.g., the shaft position signal (POS). The map may be implemented in a computer look-up table.

Figure 12:
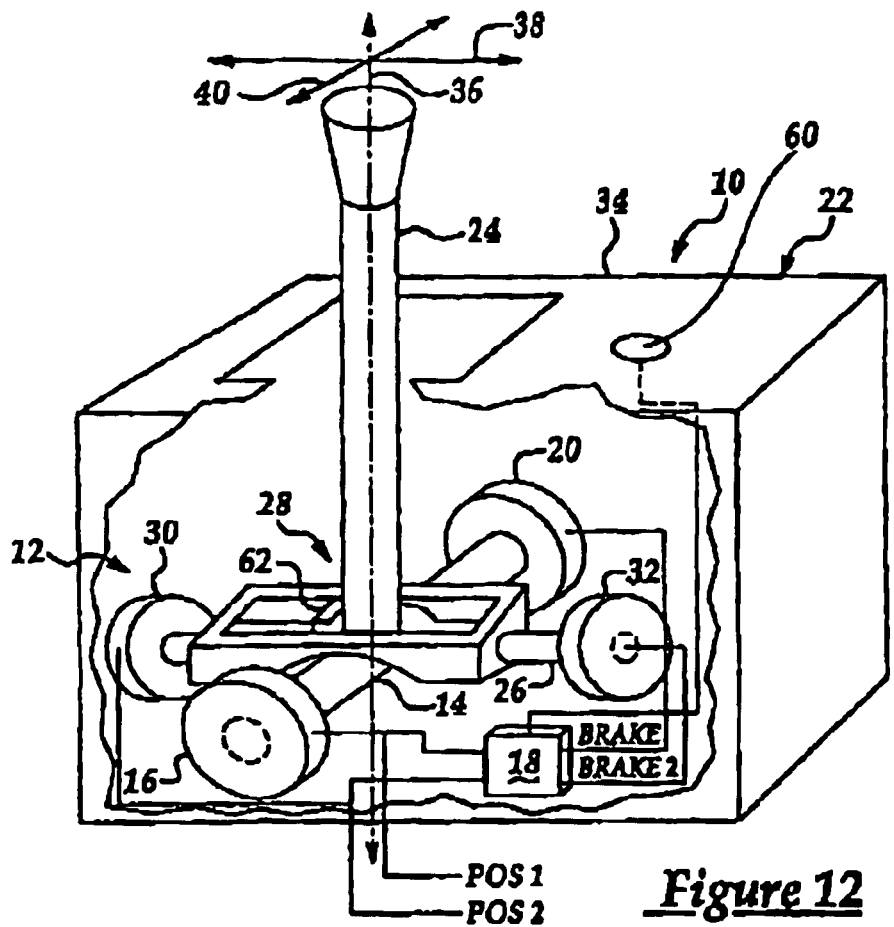
FIG. 12 is a cut-away view and functional block diagram of a joystick, according to an embodiment of the present invention; and, FIG. 13 is an illustration of a work machine which utilizes an operator interface device, according to an embodiment of the present invention.
Figure 13:
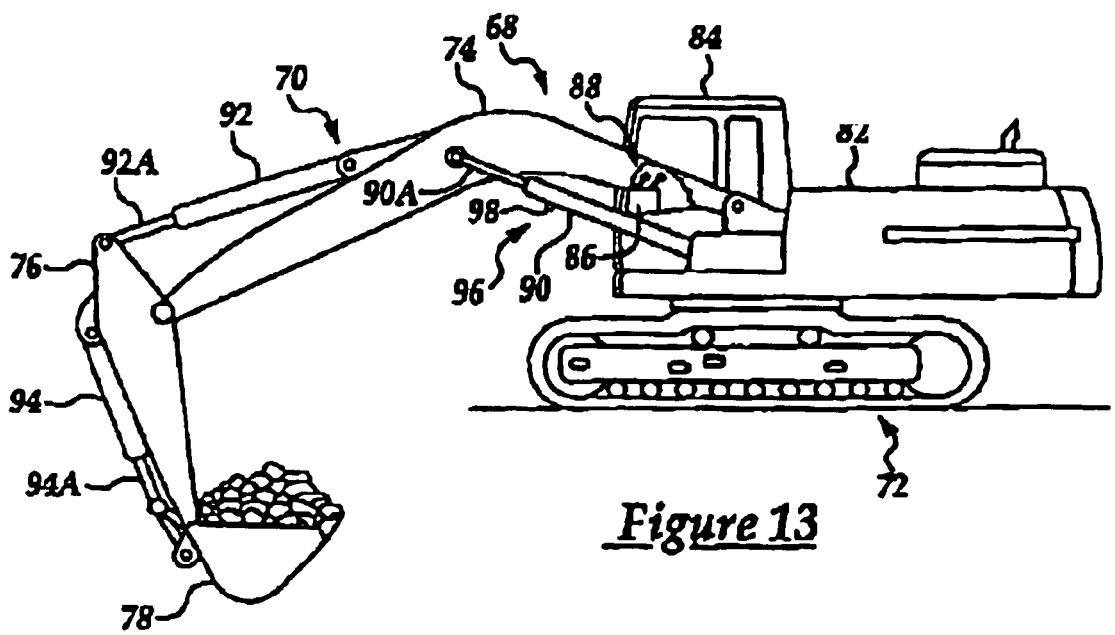

With reference to FIG. 12, in one embodiment of the present invention, the operator input device 10 may be implemented as a throttle, a gear shift, handle, lever, or (as shown) a joystick 22. The joystick 22 includes a movable member, such as a lever arm 24 coupled to the first shaft 14. The operator input device 10 with respect to the first shaft 14 operates as described above.

The lever arm 24 is also coupled to a second shaft 26 via a Gimbal arrangement 28. The Gimbal arrangement 28 allows the lever arm 24 to be moved in a variety of directions. Use of a Gimbal arrangement 28 is known to those skilled in the art and thus, will not be further explained. Other types of coupling devices may also be used.

The joystick 22 includes a second position sensor 28 and a second brake 30 coupled to the second shaft 26. The brake controller 18 may also be coupled to the second position sensor 30 and the second brake 32, although a second brake controller may also be used. The brake controller 18, the second position sensor 30 and the second brake 32 may be used to provide tactile feedback to the operator in the same manner as described above with respect to the first shaft 14.

The joystick 22 further includes a housing 34. Typically, at least a portion of the lever arm 24 extends a predetermined distance from the housing 32.

As shown, the lever 24 is centered along a center axis 36 while in a neutral position. In one embodiment, the lever 24 may be moveable in first and second directions along at least one of a first axis 38 and a second axis 40. In another embodiment, the lever 24 may be moveable in first and second directions along both the first axis 38 and the second axis 40. In still another embodiment, the lever 24 may be moveable in an infinite number of directions from the neutral position. Movement of the lever 24 in any direction is translated into rotational movement of one or both of the first and second shafts 12, 26.

The lever 24 may be biased into the neutral position by one or more biasing members 62, such as a torsional spring.

In operation, the operator moves the lever arm 24 in a desired direction. Movement of the lever arm 24 is translated via the Gimbal arrangement 28 into rotation of the shaft 14 and/or the second shaft 26. The position sensor 16 transmits the shaft position signal (POS) as described above. The second position sensor 30 transmits a second position signal (POS2) in a similar manner.

As discussed below, besides providing a virtual detent the operator input device 10 may be programmed to provide tactile feedback to the operator under other conditions.

In a first aspect of the present invention, the operator input device 10 may be programmed to provide a detent pre-feel function which provides the operator tactile feedback of an approaching detent. This is illustrated in the sample graph 36 of FIG. 3. The graph shows displacement of the operator interface mechanism 12 versus the resistive force applied by the first or second brakes. As shown, a minimal force may be applied to the operator interface mechanism 12 when it is in the neutral position. The top half of the graph, trace 38 represents the resistive force as the operator interface mechanism 12 travels in a direction away from the neutral position. The bottom half of the graph, trace 40, represents the resistive force as the operator interface mechanism 12 travels toward the neutral position. As shown, in the illustrated embodiment, the operator input device 10 may be programmed with a single detent 42A, 42B located adjacent each end of its travel. A detent pre-feel function 44A, 44B may be located prior (as the operator interface mechanism travels away from the neutral position) and adjacent the corresponding detent 42A, 42B. The detent pre-feel function 44A, 44B may have a first ramping portion 46A, 46B (an increasing force) followed by a second ramping portion 48A, 48B (a decreasing force), as shown. However, other shapes may also be utilized.

In one embodiment, a maximum detent pre-feel force associated with the detent pre-feel function is less then maximum detent force associated with the detent.

In a second aspect of the present invention, the operator input device 10 may be programmed to provide at least two detent functions in one of the first and second directions. In other words, multiple detents may be provided as the operator interface mechanism 12 is moved in the same direction. This is illustrated in the sample graph 48 of FIG. 4. The graph shows displacement of the operator interface mechanism 12 versus the resistive force applied by the first or second brake. As shown, a minimal force may be applied to the operator interface mechanism 12 when it is in the neutral position. The top half of the graph, trace 38B represents the resistive force as the operator interface mechanism 12 travels in a direction away from the neutral position. The bottom half of the graph, trace 40B, represents the resistive force as the operator interface mechanism 12 travels toward the neutral position. As shown, as the operator interface mechanism 12 is moved in any direction, multiple detents may be provided, i.e., programmed into the operator input device 10. In the illustrated embodiment, as the operator interface mechanism 12 is moved in the first direction from the neutral position (to the right in FIG. 4), three detents 52A, 52B, 52C are provided. As the operator interface mechanism 12 is returned to the neutral position, two detents may be provided 54A, 54B. As the operator interface mechanism 12 is moved in the second direction from the neutral position (to the left in FIG. 4), three detents 56A, 56B, 56C are provided. As the operator interface mechanism 12 is returned to the neutral position, two detents may be provided 58A, 58B. Although, the graph 50 is shown as being symmetrical, i.e., three detents up and 2 detents down on each side, it should be noted that any number, including zero, of detents may be provided in any one direction and on either side of the neutral position. Furthermore, as shown, one or more of the detents 52A, 52C, 52C, 54A, 54B, 56A, 56B, 56C, 58A, 58B, may have an associated detent pre-feel function.

In a third aspect of the present invention, the operator input device 10 allows the operator to define a detent. The operator input device 10 may includes an operator input mechanism 60, such as a button located within the housing 34 and accessible by the operator. In order to program a detent, the operator actuates the operator interface mechanism 12 until the desired position is achieved. The operator then places the operator input device 10 into a programming mode, for example, the input mechanism 60 may be held in an actuated state for a predetermined period of time. After the programming mode has been entered and the operator interface mechanism 12 is placed in the desired position, the operator then may actuate the input mechanism 60 again to program the detent.

As discussed above, the operator input device 10 may be provided with a biasing member 62 coupled to the operator interface mechanism 12 to bias the operator interface mechanism 12 towards the neutral position. During certain situations, the biasing member 62 may cause the operator interface mechanism 12 to "overshoot" the neutral position. With reference to FIG. 5, the operator input device 10 may be programmed to detect a return to neutral condition and responsively applying an overshoot elimination force. The return to neutral condition may be detected via the position signal, POS1, POS2. This is illustrated in the graph 64 of FIG. 5. The graph 64 shows displacement of the operator interface mechanism 12 versus the resistive force applied by the first or second brakes 30, 32. As shown, a minimal force may be applied by the brake 20, 32 to the operator interface mechanism 12 when it is at the neutral position. The top half of the graph, trace 38C, represents the resistive force as the operator interface mechanism 12 travels in a direction away from the neutral position. The bottom half of the graph, trace 40C, represents the resistive force as the operator interface mechanism 12 travels toward the neutral position. As shown, as the operator interface mechanism 12 is moved, by the operator or by the biasing member 62, towards the neutral position, an overshoot elimination function 66A, 66B may be provided (on either or both sides of the neutral position).

With reference to FIG. 12, the operator input device 10 may be utilized in a work machine 68, which is illustrated as a hydraulic excavator. It is important to note that the invention is not limited to use with hydraulic excavators. The present invention is described with respect to the hydraulic excavator for exemplary purposes only.

The work machine 68 includes a work implement 70 having moveable members that are moveable into a variety of positions to perform various work functions and motive means 72, such as a track. In the illustrated embodiment, the work implement 70 includes a boom linkage (or boom) 74, a stick linkage (or stick) 76, and a work attachment 78, shown as a bucket. The work implement 70 is supported by a machine body portion 82 which houses an engine (not shown) and supports an operator compartment 84. A control panel 86 is positioned within the operator compartment 84 so that the operator can manipulate one or more operator input devices 88 in order to move the work implement 70 through a series of positions to perform desired work functions.

The work implement 70 is moved using one or more actuators. The boom 74 is moved relative to the machine body portion 82 by a first hydraulic cylinder 90, which is normally controlled by movement of one of the operator input devices 88. Similarly, the stick 76 is moved relative to the boom 76 by a second hydraulic cylinder 92 and the bucket 78 is moved relative to the stick by a third hydraulic cylinder 94. Each cylinder 90, 92, 94 includes a moveable member or piston 90A, 92A, 94A. As stated above, the boom, stick and bucket 76, 78, 80 may be controlled by the one or more operator input devices which may include any suitable arrangement of levers, joysticks, or other input devices. Tactile feedback may be provided to the operator in the manner as set forth above or below.

In a fifth aspect of the present invention, the operator input device 10 may include a sensing device 96 for sensing a parameter of the work machine 78 and the operator input device 10 may be programmed to provide tactile feedback as a function of the sensed parameter.

In one embodiment, the tactile feedback provided as a function of the sensed parameter provides an indication when the actuator 90, 92, 94 or work implement 70 is about to move, i.e., the initiation of movement of the work implement 70. In the illustrated embodiment, this may be done by sensing the initiation of movement of one of the pistons 90A, 92A, 94A in at least one of the hydraulic cylinders 90, 92, 94. For example, the sensing device 96 could be an actuator position sensor 98 located within one of the hydraulic cylinders 90 92, 94 and adapted to detect the position of the piston 90A, 92A, 94A within the hydraulic cylinder 90, 92, 94. A velocity associated with the actuator 90, 92, 94 may be determined using the position information from the sensor in a conventional manner. This is illustrated in the sample graph 100 of FIG. 6, which shows actuator velocity versus the resistive force applied by one of the brakes 20, 32. As shown, a minimal force may be applied to the operator interface mechanism 12 when the actuator or cylinder 90, 92, 94 has zero velocity. The top half of the graph, trace 38D, represents the resistive force as the magnitude of the velocity increases and the bottom half of the graph, trace 40D, represents the resistive force as the magnitude of the velocity decreases. As shown, when the magnitude of the velocity increases and reaches a predetermined value, an actuator movement indicator function 102A, 102B may be applied. It should be noted the actuator movement indicator function 102A, 102B is independent of the position of the operator interface mechanism 12 or shaft 14.

Figure 7:
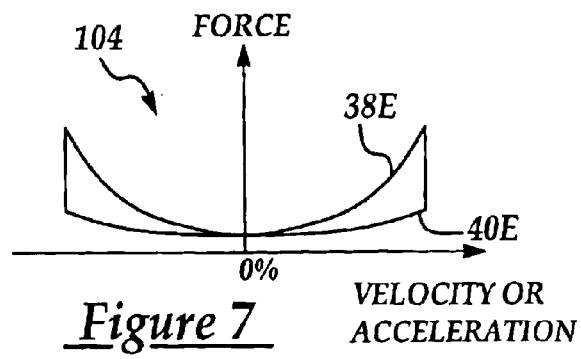
FIG. 7 is a graph of braking force versus velocity of an operator input device, according to an embodiment of the present invention.

In another embodiment of the present invention, the tactile feedback provided as function of the sensed parameter is aimed at preventing over-action on the part of the operator. In other words, the tactile feedback increase the resistive force to reflect increased effort. For example, the sensing device 90 may includes the position sensor 16 and the sensed parameter is the velocity of the operator interface mechanism 12, i.e., the shaft 14 in the illustrated embodiment. In one embodiment, the brake controller 18 determines the rotation velocity of the shaft 14 as a function of the rotary position signal in a conventional manner. This is illustrated in the sample graph 104 of FIG. 7, which shows rotation velocity of the shaft 14 versus the resistive force applied by one of the brakes 20, 32. As shown, a minimal force may be applied to the operator interface mechanism 12 when the shaft 14 has zero velocity. The top half of the graph, trace 38E, represents the resistive force as a function of the velocity of the shaft 14 is being moved away from its neutral position. The bottom half of the graph, trace 40E, represents the resistive force as a function of the velocity as the shaft 14 is being moved towards its neutral position. As shown, when the magnitude of the velocity is increasing (trace 38E), the resistive force increases to reflect increased effort. As the operator interface mechanism 12 returns to the neutral position (trace 40E), the resistance force will be smaller and more leveled. In an alternative embodiment, the sensed parameter may be an acceleration of the operator interface mechanism 14 which may be derived from the position information.

Figure 8:
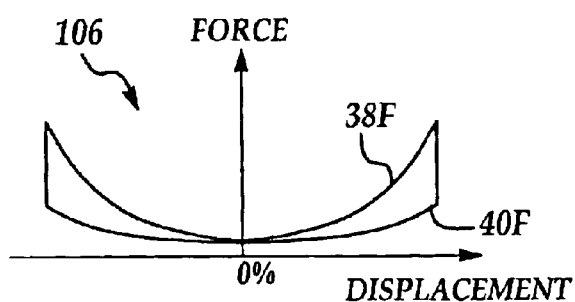
FIG. 8 is a graphic of braking force versus actuator displacement, according to an embodiment of the present invention.

In still another embodiment, the tactile feedback provided as a function of a parameter of the work machine 68 gives the operator an indication of the position of one or more of the actuators 90, 92, 94. For example, as the work implement 70 or one of the actuators 90, 92, 94 approaches its maximum or minimum displacement, the resistive force may be gradually increased. Additionally, the resistive force may be increased to give an indication that a particular position or orientation of the work implement 70 or that a position of the work implement 70 relative to an external structure, such as a water main is being approached. For example, the orientation of the work implement 70 may be defined in terms of the position of each of the hydraulic cylinders 90, 92, 94. The position or orientation of the work implement 70 may be programmed by the operator through utilization the operator input mechanism 60. An exemplary graph 106 is shown in FIG. 8. The top half of the graph, trace 38F, represents the resistive force as the position of the work implement 70 or hydraulic cylinder 90, 92, 94 approaches the designated position. The bottom half of the graph, trace 40F, represents the resistive force as the work implement 70 or hydraulic cylinder 90, 92, 94 moves away from the designated position. As shown, as the work implement 70 or hydraulic cylinder 90, 92, 94 moves away from the designated position, the resistance force may be smaller and more leveled.

Figure 9:
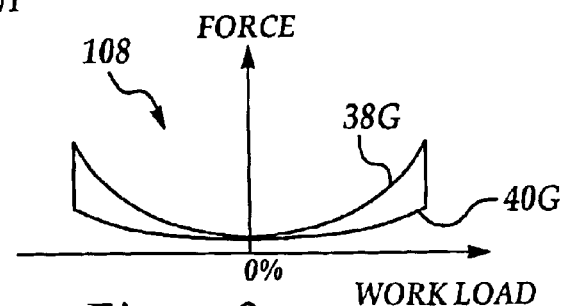
FIG. 9 is a graphic of braking force versus actuator load, according to an embodiment of the present invention.

In still another embodiment of the present invention, the tactile feedback provided as a function of a parameter of the work machine 68 gives the operator an indication of the work load on the work implement 70. For example, as the work load on the work implement 70 increases, the resistive force may be increased. This is shown in the sample graph 108 of FIG. 9. The top half of the graph, trace 38G, represents the resistive force as the work load of the work implement 70 or hydraulic cylinder 90, 92, 94 increases. The bottom half of the graph, trace 40F, represents the resistive force as the work implement 70 or hydraulic cylinder 90, 92, 94 decreases. As shown, as the work load decreases, the resistance force may be smaller and more leveled. In one embodiment, the sensing device 96 senses the load on the work implement 70. This may be accomplished, for example, by sensing the hydraulic pressure with one or more of the hydraulic cylinders 90, 92, 94.

Figure 10:
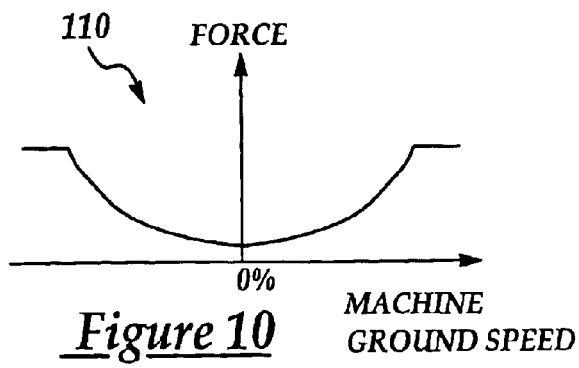
FIG. 10 is a graphic of braking force versus machine ground speed, according to an embodiment of the present invention.

In a further embodiment, the tactile feedback provided as a function of a parameter of the work machine 68 gives the operator an indication of the ground speed of the work machine 68. The tactile feedback further minimizes the risk that an accidental bump while the work machine 68 is moving will result in inadvertent motion of the operator input device 10. The sensing device 96 may include a ground speed sensor and the parameter of the work machine 68 is ground speed. This is shown in the sample graph 110 of FIG. 10 which shows the resistive force versus ground speed.

Figure 11:
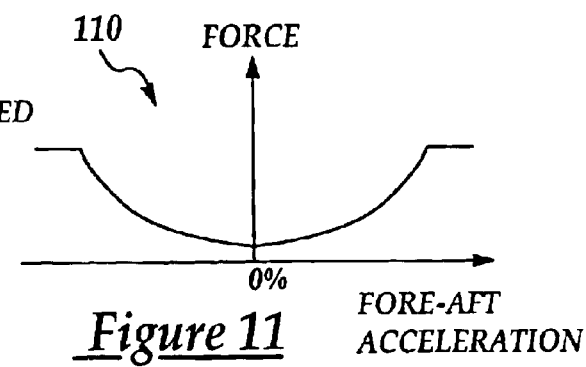
FIG. 11 is a graphic of braking force versus acceleration, according to an embodiment of the present invention.

In still a further embodiment, the tactile feedback provided as a function of a parameter of the work machine 68 gives the operator an indication of fore-aft acceleration of the work machine 68. The tactile feedback further increases operator input device stability while the work machine 68 is experiencing fore-aft acceleration. The sensing device 96 may include an acceleration sensor, such as an accelerometer and the parameter of the work machine 68 is fore-aft acceleration. This is shown in the sample graph 112 of FIG. 11 which shows the resistive force versus fore-aft acceleration.

Other aspect and features of the present invention can be obtained from a study of the drawings, the disclosure, and the appended claims.

INDUSTRIAL APPLICABILITY

The operator input device 10 may be used in various applications, such as throttles, joysticks, or a variety of levers or foot-pedals. As discussed above, the present invention provides tactile feedback to the operator of the input device 10 to simulate mechanical structural features, such as detents, and/or to provide additional tactile feedback to the operator.

It should be noted that each of the sample graphs discussed above are used to explain the corresponding feature. However, present invention is not limited to the shape of the graphs. Further, it should be noted that one or more of the tactile feedback functions may be combined and provided simultaneously or on the same operator input device 10.

From the foregoing it will be appreciated that, although specific embodiments of the invention have been described herein for purposes of illustration, various modifications may be made without deviating from the spirit or scope of the invention. Accordingly, the invention is not limited except as by the appended claims.

What is claimed is:

1. An operator input device, comprising:
    operator interface mechanism operable by an operator, the operator interface mechanism being moveable in at least first and second directions along an axis;
    a position sensor coupled to the operator interface mechanism for transmitting an operator interface mechanism position signal as a function of the position of the operator interface mechanism;
    a brake controller coupled to the position sensor for receiving the operator interface mechanism position signal and responsively transmitting a brake signal; and,
    a resistive actuator coupled to the brake controller and the operator interface mechanism for receiving the brake signal and responsively applying a resistive force to the operator interface mechanism, the resistive force opposing force applied to the operator interface mechanism by the operator, the resistive force providing a detent function and a detent pre-feel function to the operator interface mechanism.

2. An operator input device, asset forth in claim 1, wherein the detent function is defined with respect to a programmable position of the operator interface mechanism.

3. An operator input device, as set forth in claim 2, wherein the detent pre-feel function is defined by an increasing resistive force followed by a decreasing resistive force.

4. An operator input device, an set forth in claim 1, wherein a maximum detent pre-feel force associated with the detent pre-feel function is less than a maximum detent force associated with the detent function.

5. An operator input device, as set forth in claim 1, wherein the operator interface mechanism includes a handle and a rotating shaft coupled to the handle.

6. An operator input device, as set forth in claim 5, wherein the resistive actuator is one of a liner brake and a rotary brake.

7. An operator input device, as set forth in claim 1, wherein the resistive actuator is operable to provide a plurality of resistive forces to the operator interface mechanism.

8. An operator input device, as set forth in claim 1, wherein the operator interface mechanism includes one of a throttle, a gear shift, handle, lever, and joystick.

9. An operator input device, comprising:
    an operator interface mechanism operable by an operator, the operator interface mechanism being moveable in at least first and second directions along an axis;
    a position sensor coupled to the operator interface mechanism for transmitting an operator interface mechanism position signal as a function of the position of the operator interface mechanism;
    a brake controller coupled to the position sensor for receiving the operator interface mechanism position signal and responsively transmitting a brake signal; and,
    a resistive actuator coupled to the brake controller and the operator interface mechanism for receiving the brake signal and responsively applying a resistive force to the operator interface mechanism, the resistive force opposing force applied to the operator interface mechanism by the operator, the resistive force providing at least two detent functions in one of the first and second directions.

10. An operator input device, as set forth in claim 9, wherein the operator interface mechanism includes a handle and a rotating shaft coupled to the handle.

11. An operator input device, as set forth in claim 10, wherein the resistive actuator is one of a linear brake and a rotary brake.

12. An operator input device, as set forth in claim 9, wherein the resistive actuator is operable to provide a plurality of resistive forces to the operator interface mechanism.

13. An operator input device, as set forth in claim 9, wherein the operator interface mechanism includes one of a throttle, a gear shift, handle, lever, and joystick.

14. An operator input device, as set forth in claim 9, wherein the resistive force provides at least two detent functions in both the first and second direction.

15. An operator input device, as set forth in claim 9, wherein at least one of the detent functions includes a detent pre-feel.

16. An operator input device, as set forth in claim 9, wherein at least one of the detent functions is defined with respect to a programmable position of the operator interface mechanism.

17. An operator input device, comprising:
an operator interface mechanism operable by an operator, the operator interface mechanism being moveable in at least first and second directions along an axis;
a position sensor coupled to the operator interface mechanism for transmitting an operator interface mechanism position signal as a function of the position of the operator interface mechanism;
a brake controller coupled to the position sensor for receiving the operator interface mechanism position signal and responsively transmitting a brake signal;
an operator input mechanism coupled to the brake controller for delivering an input signal to the brake controller in response to actuation by the operator; and,
a resistive actuator coupled to the brake controller and the operator interface mechanism for receiving the brake signal and responsively applying a resistive force to the operator interface mechanism, the resistive force opposing force applied to the operator interface mechanism by the operator, the resistive force providing a detent function to the operator interface mechanism, the detent function defined with respect to a programmable position of the operator interface mechanism, the brake controller for receiving the input signal and responsively setting the programmable position.

18. An operator input device, as set forth in claim 17, the resistive force providing at least two detent functions in one of the first and second directions.

19. An operator input device, as set forth in claim 17, wherein the operator interface mechanism includes a handle and a rotating shaft coupled to the handle and the resistive actuator is a rotary brake.

20. An operator input device, as set forth in claim 17, wherein the resistive actuator is operable to provide a plurality of resistive forces to the operator interface mechanism.

21. An operator input device, as set forth in claim 17, wherein each detent function includes a detent pre-feel.

22. An operator input device, as set forth in claim 17, wherein the operator interface mechanism includes one of a throttle, a gear shift, handle, lever, and joystick.

23. An operator input device, comprising:
an operator interface mechanism operable by an operator, the operator interface mechanism being moveable in at least first and second directions along an axis;
a position sensor coupled to the operator interface mechanism for transmitting an operator interface mechanism position signal as a function of the position of the operator interface mechanism;
a biasing member coupled to the operator interface mechanism for biasing the operator interface mechanism towards a neutral position;
a brake controller coupled to the position sensor for receiving the operator interface mechanism position signal and responsively transmitting a brake signal; and,
a resistive actuator coupled to the brake controller and the operator interface mechanism for receiving the brake signal end responsively applying a resistive force to the operator interface mechanism, the resistive force opposing force applied to the operator interface mechanism by the operator, the resistive force providing a detent function, the brake controller for detecting a return to the neutral position and responsively applying an overshoot elimination force.

24. An operator input device, as set forth in claim 23, the resistive force providing at least two detent functions in one of the first and second directions.

25. An operator input device, as set forth in claim 23, the resistive force providing a detent pre-feel function.

26. An operator input device, as set forth in claim 23, wherein the operator interface mechanism includes a handle and a rotating shaft coupled to the handle and the resistive actuator is a rotary brake.

27. An operator input device, as set forth in claim 23, wherein the operator interface mechanism includes one of a throttle, a gear shift, handle, lever, and joystick.

28. An operator input device for controlling an aspect of a machine, comprising:
an operator interface mechanism operable by an operator, the operator interface mechanism being moveable in at least first end second directions along an axis;
a position sensor coupled to the operator interface mechanism for transmitting an operator interface mechanism position signal as a function of the position of the operator interface mechanism;
a sensing device coupled to the machine for determining a parameter of the machine and delivering a parameter signal, and the parameter is one of a velocity and acceleration associated with the operator interface mechanism;
a brake controller coupled to the position sensor and to the sensing device for receiving the operator interface mechanism position signal and the parameter signal and responsively transmitting a brake signal as a function thereof and,
a resistive actuator coupled to the brake controller and the operator interface mechanism for receiving the brake signal and responsively applying a resistive force to the operator interface mechanism, the resistive force opposing force applied to the operator interface mechanism by the operator.

29. An operator input device, as set forth in claim 28, wherein the operator input device controls an actuator having a movable element, the parameter being initiation of movement of the movable element.

30. An operator input device, as set forth in claim 29, wherein the sensing device is a second position sensor coupled to the actuator and the initiation of movement of the moveable element is defined by the velocity of the moveable element.

31. An operator input device, as set forth in claim 30,wherein the initiation of movement is detected when the velocity of the moveable element is greater than a predetermined value.

32. An operator input device, as set forth in claim 28, wherein the brake controller determines the one of the velocity and the acceleration as a function of the operator interface mechanism position signal.

33. An operator input device, as set forth in claim 32, wherein the resistive force increases as the one of the velocity and acceleration increases.

34. An operator input device, as set forth in claim 28, wherein the operator input device controls an actuator having a movable element, the parameter being position of the moveable element.

35. An operator input device, as set forth in claim 34, wherein the sensing device is a second position sensor coupled to the actuator, the resistive force applied to the operator interface mechanism being greater as the moveable element approaches a predetermined position.

36. An operator input device, as set forth in claim 35, wherein the predetermined position is one of minimum displacement and a maximum displacement.

37. An operator input device, as set forth in claim 35, wherein the predetermined position is programmable by the operator.

38. An operator input device, as set forth in claim 28, wherein the operator input device controls an actuator having a movable element and the sensing device senses a load applied to the actuator.

39. An operator input device, as set forth in claim 38, wherein the resistive force, the resistive force increasing as the load applied to the actuator increases.

40. An operator input device, as set forth in claim 28, wherein the machine is a mobile machine, the sensing device senses a velocity associated with the mobile machine, the resistive force increasing as the velocity increases.

41. An operator input device, as set forth in claim 28, wherein the sensing device senses an acceleration associated with the machine, the sensing device including an accelerometer for sensing an acceleration associated with the machine, the resistive force increasing as the acceleration increases.

* * * * *